US008025144B2

(12) United States Patent
Lewis et al.

(10) Patent No.: US 8,025,144 B2
(45) Date of Patent: Sep. 27, 2011

(54) CONVEYOR BELTS WITH THIN FILM SENSOR-ACTIVATING COATING

(75) Inventors: William Christopher Lewis, Algonquin, IL (US); William James Lewis, Woodstock, IL (US); Lambert Allen Terpstra, Crystal Lake, IL (US); Barton Roy Lewis, Sr., Algonquin, IL (US)

(73) Assignee: Advanced Flexible Composites, Inc., Lake in the Hills, IL (US)

( * ) Notice: Subject to any disclaimer, the term of this patent is extended or adjusted under 35 U.S.C. 154(b) by 1290 days.

(21) Appl. No.: 11/057,004

(22) Filed: Feb. 11, 2005

(65) Prior Publication Data

US 2006/0180440 A1 Aug. 17, 2006

(51) Int. Cl.
*B65G 43/00* (2006.01)

(52) U.S. Cl. .............. 198/810.03; 198/810.01; 198/804; 198/618; 474/260; 474/263

(58) Field of Classification Search ............. 198/810.03, 198/810.02, 810.01, 804, 618
See application file for complete search history.

(56) References Cited

U.S. PATENT DOCUMENTS 3,388,811 A 6/1968 Kuwayama et al.
3,565,015 A 2/1971 Jorgensen
3,696,946 A 10/1972 Hunter et al.
3,696,949 A 10/1972 Leblond et al.
3,872,695 A 3/1975 Busek
3,946,655 A 3/1976 Schy
4,036,569 A 7/1977 Oshikiri
4,197,792 A 4/1980 Mendoza
4,228,513 A 10/1980 Doljack
4,318,465 A 3/1982 Calvert et al.
4,368,019 A 1/1983 Thompson
4,535,506 A 8/1985 Hendriks et al.
4,582,472 A 4/1986 Hanson
4,621,727 A * 11/1986 Strader .................... 198/810.02
4,668,524 A 5/1987 Kirkpatrick
4,733,891 A 3/1988 Cervinka
4,905,581 A 3/1990 Kirkpatrick
4,936,203 A 6/1990 Aoki et al.
4,938,126 A 7/1990 Rubio et al.
4,956,530 A 9/1990 Koch
5,020,426 A 6/1991 Cope et al.
5,085,138 A 2/1992 Fehr et al.
5,095,684 A 3/1992 Walker et al.
5,131,803 A 7/1992 Banek
5,216,256 A 6/1993 Kusumoto et al.
5,231,919 A 8/1993 Lawrence et al.
5,241,899 A 9/1993 Kuhlman
6,127,822 A * 10/2000 Sasahara et al. .............. 324/209
6,581,755 B1 * 6/2003 Wilke et al. .............. 198/810.03
6,679,798 B1 * 1/2004 Takagi et al. ................. 474/242
6,758,779 B2 * 7/2004 Fujimoto ....................... 474/260
2003/0012867 A1 * 1/2003 Madaras et al. .................. 427/8
2004/0033856 A1 * 2/2004 Levine .......................... 474/247
2004/0129538 A1 * 7/2004 Stebnicki et al. ............. 198/832
2005/0006208 A1 * 1/2005 Armstrong ............... 198/810.03

FOREIGN PATENT DOCUMENTS

JP 60041451 A 3/1985

* cited by examiner

*Primary Examiner* — Kavel Singh
(74) *Attorney, Agent, or Firm* — Pauley Petersen & Erickson

(57) ABSTRACT

A conveyor belt device wherein a detectable coating, such as in the form of a thin film, overlies selected portions of a conveyor belt substrate surface. Suitable detectable coatings include materials that are inductive, conductive, magnetic, reflective, fluorescent and color-indicating or a combination thereof. Also disclosed are associated or corresponding conveyor belt assemblies and methods of making.

27 Claims, 2 Drawing Sheets

CONVEYOR BELTS WITH THIN FILM SENSOR-ACTIVATING COATING

BACKGROUND OF THE INVENTION

This invention relates generally to conveyor belts and, more particularly, to conveyor belts having a thin film sensor-activating coating.

Conveyor systems have long been utilized in various manufacture and production applications. Conveyor systems, such as incorporating one or more conveyor belts, commonly make use of various mechanisms to activate or trigger certain actions to be performed by equipment associated with the conveyor belt. Such actions include, but are not limited to, sorting, labeling, counting, indexing, and packaging, for example. Common or typical activating or triggering mechanisms employed in such applications can include: a product on the conveyor belt, a tray or other mechanical means attached to the conveyor belt, or a mechanism associated with the pulley system associated with the conveyor belt, for example.

It is known to either sense the presence of a product or item or to sense one or more features or characteristics, such as color, metal content, magnetic content or conductivity, for example, of a product or item being transported or conveyed via a conveyor belt. It is also known to use metal rods and proofing, forming and molding trays attached to a conveyor belt surface or comprising the conveyor belt surface for the purpose of actuating or triggering an action by the equipment associated with the conveyor belt.

For example, U.S. Pat. No. 5,231,919, issued 3 Aug. 1993 and whose disclosure is hereby incorporated by reference, discloses the use of detectable means, such as in the form of metal tabs or strips, attached at predetermined spacings along the surface of a conveyor belt. In accordance with one specifically disclosed embodiment, metal strips of cold rolled steel of 0.005 inches thickness by 0.50 inches wide by 2.50 inches long are attached to a conveyor belt by affixing a polytetrafluoroethylene (PTFE) coated fiberglass belt material patch to the belt surrounding each of the metal strips.

Unfortunately, the attachment of a metal-containing pouch to a PTFE coated fiberglass belt surface presents various problems and complications and is subject to various limitations. First, PTFE coated fiberglass belts typically range in thickness from about 0.008 inches to 0.014 inches (depending on the fabric style). Thus, the addition of a pouch and a metal tab or strip held therein can significantly alter the thickness of the conveyor belt device in the vicinity of the metal strips. For example, devices commercially available from Lawrence Equipment, Inc., the assignee identified on U.S. Pat. No. 5,231,919, and which devices included conveyor belts with such pouches and detectable metal strips, have been analyzed and the dimensions thereof have been measured. In particular, such commercially available devices have been found to contain such metal strips formed of stainless steel and measuring 0.007 inches thick by 0.25 inches wide by 1.75 inches long. Thus, the inclusion of such a pouch and metal strip brings total thickness at the pouch to approximately 0.028 inches and 0.040 inches, respectively, or approximately 4 times the thickness of an original 0.008 inch thick belt surface. As will be appreciated, the inclusion of such metal strips constitutes a significant difference in thickness that can present problems and complications as the belt rides over pulleys, such as resulting in the distortion of the conveyor belt, and in some cases, belt ripping and tracking issues.

Second, due at least in part to the large variation in thickness in the vicinity of the metal strips, such belts must typically be run with the pouches and associated metal strips on the inside of the conveyor belt so it does not distort the products being pressed on the belt surface. Additionally, since such pouches are joined or attached to the belt, the pouches themselves as well as the attachment to the belt are susceptible to grease and oil such as present in products or items conveyed on the belt and such as may be pressed thereagainst. Moreover, if one were to operate the belt with the pouches and associated metal strips on the outside of the conveyor belt, such grease and oil could undesirably act to saturate the pouch such as to result in the pouch delaminating from the surface of the conveyor belt.

Third, such pouch and metal strip-including conveyor belts can be very time consuming to prepare or manufacture. For example, such pouch and metal strip including conveyor belts typically require or involve, in some selected order, appropriately cutting the material pouches and the metal strips, respectively, to desired sizes and shapes; appropriately measuring and marking the belt to indicate the locations for the steel strips and pouches; appropriately attaching the material pouches to the belt surface and appropriately placing the steel strips on the belt. The time required for such belt preparation or manufacture can typically amount to 30 minutes or more per belt.

Finally, this patent specifically mentions the use of cold rolled steel metal strips. Rolled steel is rigid, and when cut, has sharp corners or edges. Conveyor belts such as formed of fiberglass coated with PTFE, as in this patent, are susceptible to tearing under pressure. It will be appreciated that a conveyor operating with a belt having such pouches on the inside of the belt, can be more prone to stresses such as resulting the metal strip containing pouch running over a pulley in the conveyor assembly and such as may result in such metal strip being undesirably pushed through either the surface of the belt or the pouch.

In view of the above, there is a need and a demand for improvements in conveyor belt devices such as to facilitate or otherwise improve the incorporation or use of such conveyor belt devices in conjunction with associated equipment or machinery. In particular, there is a need and a demand for a conveyor belt device and associated combinations which include or incorporate a sensor-activating material in a form that is effective and yet does not unduly hinder the conveyor or the operation of the conveyor and associated equipment.

SUMMARY OF THE INVENTION

A general object of the invention is to provide an improved sensor-activating conveyor belt.

A more specific objective of the invention is to overcome one or more of the problems described above.

The general object of the invention can be attained, at least in part, through a conveyor belt device having a conveyor belt substrate, with opposed first and second surfaces, and a detectable coating overlying a selected portion of the conveyor belt substrate first surface.

The prior art generally fails to provide sensor-activating conveyor belts that have a desirably low profile. In particular, the prior art fails to provide conveyor belt devices that utilize a thin film sensor activating coating such are conformable and compatible with the conveyor belt surface and such as do not exhibit the limitations of the hard rolled steel strips such as, the tearing of the conveyor belt or associated pouch fabrics.

The invention further comprehends a conveyor belt device that includes a longitudinally extending conveyor belt substrate having opposed first and second surfaces. A thin-film detectable coating overlies a plurality of longitudinally spaced apart portions of the conveyor belt substrate first surface. Such a detectable coating includes a detectable material selected from the group consisting of inductive, conductive, magnetic, reflective, fluorescent, color-indicating and combinations thereof. A topcoat overlies the detectable coating.

Also disclosed are associated or corresponding conveyor belt assemblies and methods of making.

As used herein, references to a "thin film" coating are to be understood to generally refer to a coating that is less than 0.01 inches thicker, preferably no more than 0.006 inches thicker, and in accordance with certain embodiments less than 0.005 inches thicker and, in accordance with certain preferred embodiments, no more than about 0.004 inches thicker than a corresponding conveyor belt without the sensor activating coating.

Other objects and advantages will be apparent to those skilled in the art from the following detailed description taken in conjunction with the appended claims and drawings.

DETAILED DESCRIPTION OF THE INVENTION

The present invention provides an improved sensor-activating conveyor belt. More particularly, the invention provides a conveyor belt device having a selectively applied thin film sensor-activating coating. Due to recent, significant developments in polymer chemistry and material sciences and as described in greater detail below, it is now possible to incorporate sensor-activating additives directly into a coating, e.g., into a polymer coating. More particularly, thin film sensor-activating coatings in accordance with the invention can desirably be applied directly to the surface of a conveyor belt and, upon cure, become part of the conveyor belt surface. Moreover, such thin film coatings desirably overcome various of the above-described limitations of prior art devices.

Figure 1:
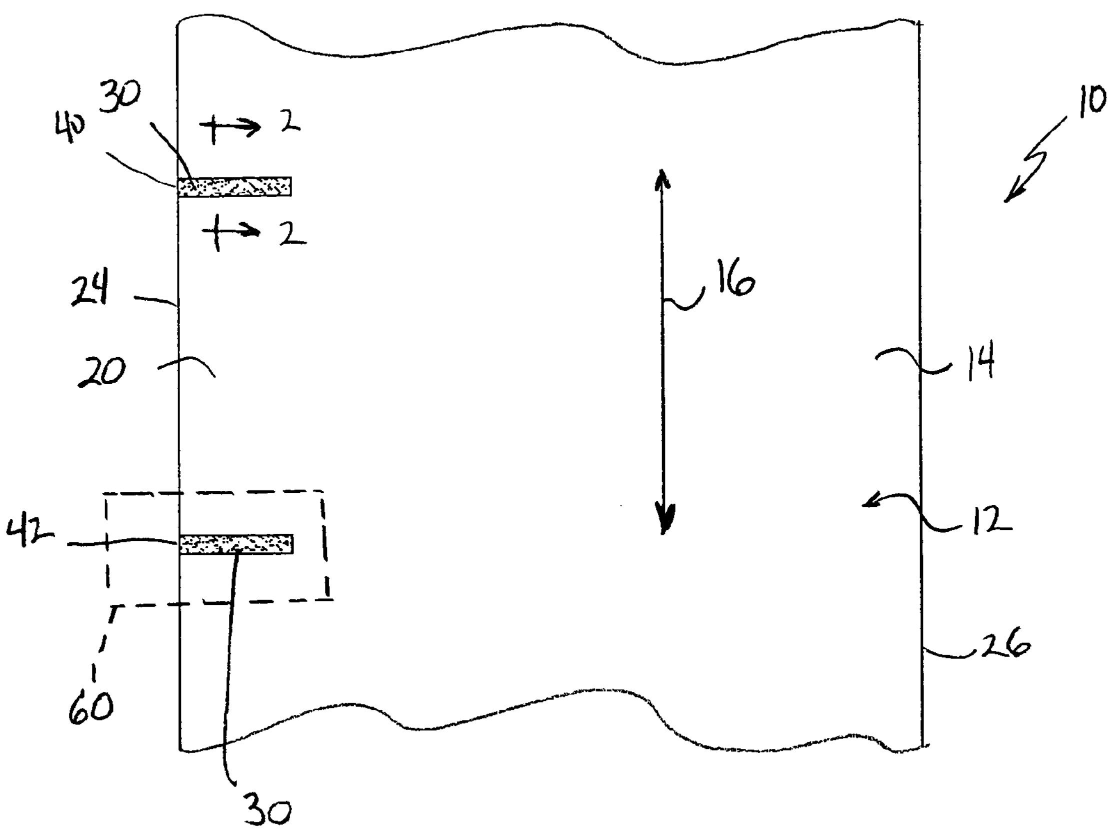
FIG. 1 is a fragmentary top view of a conveyor belt device and sensor combination in accordance with one preferred embodiment of the invention.

Turning to FIG. 1 there is shown a fragmentary top view of a conveyor belt device and sensor combination, generally designated by the reference numeral 10. The combination 10 includes a conveyor belt device 12 in accordance with the invention and such as in the form of an endless belt formed at least in part by a conveyor belt substrate 14. Suitable conveyor belt substrates used in the practice of the invention include, for example and without necessary limitation, various materials or fabrics such as fiberglass, aramid, polyester, nylon, polyetheretherkeytone, carbon fiber and combinations thereof.

The conveyor belt substrate 14 is longitudinally extending as signified by the double headed arrow 16. The conveyor belt substrate 12 includes or has opposed first and second surfaces, 20 and 22 (shown in FIG. 2), respectively. The conveyor belt substrate 12 also includes or has opposed first and second edges, 24 and 26, respectively.

Figure 2:
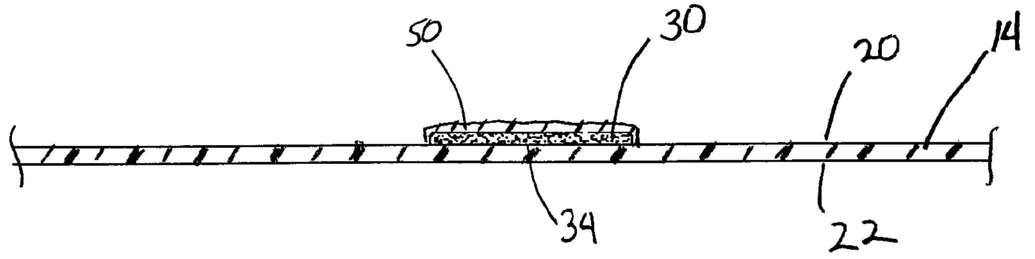
FIG. 2 is a simplified cross sectional side view of the conveyor belt device shown in FIG. 1 and taken along the line 2-2 in FIG. 1.

As described in greater detail below, the conveyor belt device 10 has or includes a detectable coating 30. As shown in FIG. 2 in exaggerated and not to scale form, the detectable coating 30 overlies a selected portion 34 of the conveyor belt substrate first surface 20. Detectable coatings used in the practice of the invention include, for example and without necessary limitation, a detectable material such as selected from the group consisting of inductive, conductive, magnetic, reflective, fluorescent, color-indicating and combinations thereof.

For example, in accordance with one preferred embodiment of the invention, a desired detectable coating is an inductive coating. Suitable such inductive coatings desirably may include an inductive material such as selected from the group consisting of aluminum foil flake, stainless steel flake, stainless steel powder, iron powder, inductive radio frequency tag, aluminum foil strip, inductive ink, metal ceramic powder and combinations thereof, as well as similar materials and various combinations of such inductive materials.

In accordance with another preferred embodiment of the invention, a desired detectable coating is a conductive coating. Suitable such conductive coatings desirably may include a conductive material selected from the group consisting of carbon, metal pigments, metal powders, metal inks, metal ceramic powders and combinations thereof, as well as similar materials and various combinations of such conductive materials. For example, suitable conductive metal pigments, powders and inks can desirably include those containing copper, nickel, silver or combinations thereof.

In accordance with another preferred embodiment of the invention, a desired detectable coating is a magnetic coating. Suitable such magnetic coatings may desirably include a magnetic material selected from the group consisting of steel powder, iron powder, iron oxide powder, magnetic ceramic powders and combinations thereof, as well as similar materials and various combinations of such magnetic materials.

In accordance with another preferred embodiment of the invention, a desired detectable coating is a reflective coating. Suitable such reflective coatings may desirably include a reflective material selected from the group consisting of silver pigment or ink, aluminum pigment or ink, nickel pigment or ink, chrome pigment or ink, mica particles, glass particles, metal ceramic particles, aluminum foil strips, aluminum foil flakes and combinations thereof, as well as similar materials and various combinations of such reflective materials.

In accordance with another preferred embodiment of the invention, a desired detectable coating is a fluorescent coating. Suitable such fluorescent coatings may desirably include a fluorescent material selected from the group consisting of mica, metal ceramic powder, ink and combinations thereof, as well as similar materials and various combinations of such fluorescent materials.

In accordance with another preferred embodiment of the invention, a desired detectable coating is a color-indicating coating. Suitable such color-indicating coatings may desirably include a color-indicating material selected from the group consisting of mica pigments, metal ceramic pigments, metal pigments and combinations thereof as well as similar materials and various combinations of such color-indicating materials.

In addition, suitable detectable coating such as described above may additionally preferably include a base material such as a base material selected from the group consisting of fluoropolymers, fluoroelastomers, polyetheretherkeytones, silicone elastomers, thermoplastics and combinations thereof.

In accordance with certain preferred embodiments of the invention, the detectable coating 30 overlies a plurality of longitudinally spaced apart portions of the conveyor belt substrate first surface 20. More particularly, as shown in FIG. 1, the detectable coating 30 overlies both a first portion 40 and a second portion 42 of the conveyor belt substrate first surface 20, and which first and second portions 40 and 42 are longitudinally spaced apart portions of the conveyor belt substrate first surface 20 along the first edge 24. It will be understood, however, that such a detectable coating could alternatively or in addition be appropriately disposed at or on the conveyor belt substrate first surface 20 along the second edge 26, the conveyor belt substrate second surface 22 along the first edge 24, or the conveyor belt substrate second surface 22 along the second edge 26, as may be desired for particular applications.

In accordance with the general practice of the invention, at least one of the detectable coating and the conveyor belt substrate first or second surfaces is treated with a primer effective to adhere the detectable coating to the desired conveyor belt substrate surface. Suitable primer materials for use in the practice of the invention include but are not limited to silanes, titanates, zirconates, fluoroplastics, copolymers of PTFE, and combinations of two or more of these materials.

The detectable coating is then applied onto the desired conveyor belt substrate surface wherein at least one of the detectable coating and the conveyor belt substrate first or second surfaces has been treated with the primer to form a conveyor belt device precursor having a desired first or second surface with a detectable coating. Finally, the detectable coating is covered by a topcoat 50 (shown in FIG. 2) such as in the form of a polymer topcoat. The topcoat desirably serves to encapsulate and protect the detectable coating. Suitable topcoat materials include but are not limited to fluoropolymers, fluoroelastomers, polyetheretherkeytones, silicone elastomers, thermoplastics and combinations thereof.

According to one preferred embodiment of the invention, a conveyor belt substrate is first treated with a primer to better ensure adhesion of the detectable coating to or with the substrate. The desired detectable coating is then applied to the primed conveyor belt substrate. Finally, the detectable coating is covered by a suitable topcoat, such as described above.

Those skilled in the art and guided by the teachings herein provided will appreciate that various methods or techniques can be applied for forming an endless conveyor belt loop composed of a conveyor belt device of the invention. For example, a length of conveyor belt material in accordance with the invention and having a pair of opposed ends, with a first of the opposed ends having a male pattern and a second of the opposed ends having a female pattern, can have such opposed ends mated together with an appropriate connector. Alternatively, a length of conveyor belt material in accordance with the invention and having a pair of opposed ends can have such opposed ends welded together. Thus it is to be understood that the broader practice of the invention is not necessarily limited by or to specific methods for forming such conveyor belt loops.

A conveyor assembly, in accordance with one embodiment of the invention comprises such a conveyor belt device and a corresponding or associated sensor, such as schematically represented by 60, capable of sensing the detectable coating. As will be appreciated by those skilled in the art and guided by the teachings herein provided, various sensors known in the art can be suitably employed in the practice of the invention in conjunction with an appropriate detectable coating. For example, a conveyor assembly for use in association with a conveyor belt device having a detectable inductive coating in accordance with the invention desirably will include an inductive sensor, such as known in the art, capable of sensing the detectable inductive coating. Moreover, the position or placement of such a corresponding or associated sensor can be appropriately varied and selected to satisfy the requirements for particular applications. For example, the invention can, if desired, be practiced employing a sensor appropriately positioned above, below, or side adjacent a detectable-coated conveyor belt in accordance with the invention.

Similarly, a conveyor assembly for use in association with a conveyor belt device having a detectable conductive coating in accordance with the invention desirably will include a conductive sensor, such as known in the art, capable of sensing the detectable conductive coating.

Similarly, a conveyor assembly for use in association with a conveyor belt device having a detectable magnetic coating in accordance with the invention desirably will include a magnetic sensor, such as known in the art, capable of sensing the detectable magnetic coating.

Similarly, a conveyor assembly for use in association with a conveyor belt device having a detectable reflective coating in accordance with the invention desirably will include a light sensor, such as known in the art, capable of sensing the detectable reflective coating.

Similarly, a conveyor assembly for use in association with a conveyor belt device having a detectable fluorescent coating in accordance with the invention desirably will include a fluorescent sensor capable of sensing the detectable fluorescent coating.

Similarly, a conveyor assembly for use in association with a conveyor belt device having a detectable color-indicating coating in accordance with the invention desirably will include a color-indicating sensor capable of sensing the detectable color-indicating coating.

Thin film sensor-activating coated conveyor belts in accordance with the invention are typically and desirably no more than 0.01 inches thicker than a corresponding conveyor belt without the sensor activating coating. In practice, thin film sensor-activating coated conveyor belts in accordance with the invention are generally a maximum of about 0.006 inches thicker and, on average, less than about 0.005 inches thicker and preferably about 0.004 or less thicker than a corresponding conveyor belt without the sensor activating coating. For example, for a PTFE coated fiberglass belt having a 0.007 inches thick belt surface, this translates into an average thickness of 0.011 inches, and for a PTFE coated fiberglass belt having a 0.014 inch thickness, this translates into an average thickness of 0.018 inches, as compared to the 0.028 inches and 0.040 inches, respectively, described above relative to the prior art conveyor belt device. Thus, the invention presents a reduction in the thickness of the sensor-activating surface of over 250% as compared to the above-identified commercially available product.

Those skilled in the art and guided by the teachings herein provided will understand and appreciate that through the use of sensor-activating coatings in accordance with the invention and which coatings are conformable and compatible with the conveyor belt surface, the incorporation and use of such coatings generally do not exhibit the limitations associated with prior art structures such as incorporate hard rolled steel strips, e.g., tearing of the conveyor belt or pouch fabrics, as described above.

In addition, when used in conjunction with a sensor device able to sense, through the belt, a sensor-activating coating in accordance with the invention, the invention enables an operator of the conveyor belt to operate the conveyor belt in a manner that puts the sensor-activating coating on either the inside or outside of the conveyor belt. Additionally, it enables the belt operator to flip the belt over in order to extend belt life.

The invention will be further described below making reference to specific preferred embodiments for making a conveyor belt device in accordance with the invention.

One of the preferred embodiments of the invention involves the treatment of a PTFE coated fiberglass conveyor belt with a liquid primer. The primer is then dried, leaving a thin film. Next, primed metal particles dispersed in water and PTFE are applied to the primed conveyor belt surface and then dried. A filled protective PTFE top coat is applied over the metal particle coating to hold it in place and to create a uniform, grease resistant coating. Finally, the protective coating is appropriately dried and then heat sealed.

Another preferred embodiment of the invention involves the treatment of a PTFE coated fiberglass conveyor belt with a liquid primer. The primer is then dried, leaving a thin film. Next, a primed aluminum foil strip is applied to the belt surface and then dried. A filled protective PTFE top coat is applied over the metal particle coating to hold it in place and to create a uniform, grease resistant coating. Finally, the protective coating is appropriately dried and then heat sealed.

Still another preferred embodiment of the invention involves the treatment of a silicone coated polyester conveyor belt with a silicone elastomer coating containing a highly conductive graphite additive. The silicone elastomer coating containing a highly conductive graphite additive is then appropriately dried and cured.

Another preferred embodiment is of the invention involves the treatment of a PTFE coated aramid fabric with a PTFE coating containing a highly conductive graphite additive. The PTFE coating containing a highly conductive graphite additive coating is then appropriately dried and cured.

Another preferred embodiment of the invention involves the treatment of a PTFE coated fiberglass fabric with a PTFE coating containing a highly reflective mica additive. Finally, the PTFE coating containing a highly reflective mica additive coating is appropriately dried and cured.

A further preferred embodiment of the invention involves the treatment of a silicone coated polyester conveyor belt with a silicone elastomer coating containing a fluorescent additive. The fluorescent additive-containing coating is then appropriately dried and cured.

In accordance with another aspect of the invention, a conveyor belt device in addition to or in place of a detectable coating, as described above, may desirably include or incorporate one or more specifically located voids or openings passing therethough. With such a conveyor device, a sensor combination such as composed of a transmitter and a receiver may be appropriately positioned on opposite sides of the conveyor belt device such that a signal sent from the transmitter will, when such void or opening is present, appropriately pass through the belt void or opening and be received by or at the receiver.

The invention provides conveyor belt devices that employ or incorporate a thin film coating that will trigger or activate associated sensing devices utilized in conjunction with conveyor belting. The incorporation and use of such thin film coatings overcome various of the limitations of the prior art devices.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A conveyor belt device comprising:

a conveyor belt substrate having opposed first and second surfaces; and a detectable coating overlying and chemically adhered to a selected portion of the conveyor belt substrate first surface, the detectable coating comprising a fluorescent coating and wherein the fluorescent coating comprises a fluorescent material selected from the group consisting of mica, metal ceramic powder, ink and combinations thereof.

2. The conveyor belt device of claim 1 additionally comprising a topcoat overlying at least the detectable coating overlying the selected portion of the conveyor belt substrate first surface.

3. A conveyor assembly comprising:

the conveyor belt device of claim 1; and a fluorescent sensor capable of sensing the detectable fluorescent coating.

4. The conveyor belt device of claim 1 wherein the detectable coating additionally comprises a base material selected from the group consisting of fluoropolymers, fluoroelastomers, polyetheretherkeytones, silicone elastomers, thermoplastics and combinations thereof.

5. The conveyor belt device of claim 4 additionally comprising a surface coating comprising a material selected from the group consisting of fluoropolymers, fluoroelastomers, polyetheretherkeytones, silicone elastomers, thermoplastics and combinations thereof.

6. A method of making the conveyor belt device comprising: a conveyor belt substrate having opposed first and second surfaces; and a detectable coating overlying and chemically adhered to a selected portion of the conveyor belt substrate first surface, said method comprising:

treating at least one of the conveyor belt substrate first surface and the detectable coating with a primer effective to adhere the detectable coating to the conveyor belt substrate first surface;

applying the detectable coating onto the conveyor belt substrate first surface wherein at least one of the conveyor belt substrate first surface and the detectable coating has been treated with the primer to form a conveyor belt device precursor having a first surface with a detectable coating; and applying a topcoat overly the detectable coating of the conveyor belt device precursor.

7. A method of making the conveyor belt device comprising: a longitudinally extending conveyor belt substrate having opposed first and second surfaces; a thin-film detectable coating chemically adhered to the conveyor belt substrate and overlying a plurality of longitudinally spaced apart portions of the conveyor belt substrate first surface, wherein the detectable coating comprises a detectable material selected from the group consisting of inductive, conductive, magnetic, reflective, fluorescent, color-indicating and combinations thereof; and a topcoat to overlying the detectable coating, said method comprising:

treating at least one of the conveyor belt substrate first surface and the detectable coating with a primer effective to adhere the detectable coating to the conveyor belt substrate first surface;

applying the detectable coating onto longitudinally spaced apart locations on the conveyor belt substrate first surface wherein at least one of the conveyor belt substrate first surface and the detectable coating has been treated with the primer to form a conveyor belt device precursor; and applying a topcoat to overlay the detectable coating of the conveyor belt device precursor.

8. The method of claim 7 wherein the detectable coating is chemically and mechanically bonded to the conveyor belt substrate first surface.

9. A conveyor belt device comprising:

a longitudinally extending conveyor belt substrate having opposed first and second surfaces;

a polymer primer layer applied to the first surface of the conveyor belt substrate;

a detectable coating overlying a selected portion of the conveyor belt substrate first surface, the detectable coating one of on or within the primer layer; and a polymer topcoat disposed over at least one of the primer layer and the detectable coating.

10. The conveyor belt device of claim 9 wherein the detectable coating overlies a plurality of longitudinally spaced apart portions of the conveyor belt substrate first surface.

11. The conveyor belt device of claim 9 wherein the detectable coating consists essentially of a thin-film.

12. The conveyor belt device of claim 9 wherein the conveyor belt substrate comprises a material selected from the group consisting of fiberglass, aramid, polyester, nylon, polyetheretherkeytone, carbon fiber and combinations thereof.

13. The conveyor belt device of claim 9 wherein the detectable coating comprises a detectable material selected from the group consisting of inductive, conductive, magnetic, reflective, fluorescent, color-indicating and combinations thereof.

14. The conveyor belt device of claim 13 wherein the detectable coating is an inductive coating and wherein the inductive coating comprises an inductive material selected from the group consisting of aluminum foil flake, stainless steel flake, stainless steel powder, iron powder, inductive radio frequency tag, aluminum foil strip, inductive ink, metal ceramic powder and combinations thereof.

15. A conveyor assembly comprising:

the conveyor belt device of claim 14; and an inductive sensor capable of sensing the detectable inductive coating.

16. The conveyor belt device of claim 13 wherein the detectable coating is a conductive coating and wherein the conductive coating comprises a conductive material selected from the group consisting of carbon, metal pigments, metal powders, metal inks, metal ceramic powders and combinations thereof.

17. A conveyor assembly comprising:

the conveyor belt device of claim 16; and a conductive sensor capable of sensing the detectable conductive coating.

18. The conveyor belt device of claim 13 wherein the detectable coating is a magnetic coating and wherein the magnetic coating comprises a magnetic material selected from the group consisting of steel powder, iron powder, iron oxide powder, magnetic ceramic powders and combinations thereof.

19. A conveyor assembly comprising:

the conveyor belt device of claim 18; and a magnetic sensor capable of sensing the detectable magnetic coating.

20. The conveyor belt device of claim 13 wherein the detectable coating is a reflective coating and wherein the reflective coating comprises a reflective material selected from the group consisting of silver pigment or ink, aluminum pigment or ink, nickel pigment or ink, chrome pigment or ink, mica particles, glass particles, metal ceramic particles, aluminum foil strips, aluminum foil flakes and combinations thereof.

21. A conveyor assembly comprising:

the conveyor belt device of claim 20; and a light sensor capable of sensing the detectable reflective coating.

22. The conveyor belt device of claim 13 wherein the detectable coating is a color-indicating coating and wherein the color-indicating coating comprises a color-indicating material selected from the group consisting of mica pigments, metal ceramic pigments, metal pigments and combinations thereof.

23. A conveyor assembly comprising:

the conveyor belt device of claim 14; and a color sensor capable of sensing the detectable color-indicating coating.

24. A conveyor assembly comprising:

the conveyor belt device of claim 13; and a sensor capable of sensing the detectable coating.

25. The conveyor belt device of claim 13 wherein the detectable coating comprises a base material selected from the group consisting of fluoropolymers, fluoroelastomers, polyetheretherkeytones, silicone elastomers, thermoplastics and combinations thereof.

26. The conveyor belt device of claim 9 wherein the polymer topcoat comprises a material selected from the group consisting of fluoropolymers, fluoroelastomers, polyetheretherkeytones, silicone elastomers, thermoplastics and combinations thereof.

27. A conveyor assembly comprising:

the conveyor belt device of claim 9; and a sensor capable of sensing the detectable coating.

* * * * *

UNITED STATES PATENT AND TRADEMARK OFFICE

CERTIFICATE OF CORRECTION

PATENT NO. : 8,025,144 B2
APPLICATION NO. : 11/057004
DATED : September 27, 2011
INVENTOR(S) : William Christopher Lewis et al.

It is certified that error appears in the above-identified patent and that said Letters Patent is hereby corrected as shown below:

Column 10: line 30: in Claim 23, replace “claim 14” with -claim 22-

Signed and Sealed this
Third Day of April, 2012

David J. Kappos
*Director of the United States Patent and Trademark Office*